(12) United States Patent
Kalhan et al.

(10) Patent No.: US 12,349,182 B2
(45) Date of Patent: Jul. 1, 2025

(54) MANAGEMENT OF DEVICE-TO-DEVICE COMMUNICATION RESOURCES

(71) Applicant: Kyocera Corporation, Kyoto (JP)

(72) Inventors: Amit Kalhan, San Diego, CA (US); Henry Chang, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 149 days.

(21) Appl. No.: 16/704,937

(22) Filed: Dec. 5, 2019

(65) Prior Publication Data

US 2020/0107334 A1 Apr. 2, 2020

Related U.S. Application Data

(63) Continuation of application No. 15/105,451, filed as application No. PCT/US2014/071266 on Dec. 18, 2014, now Pat. No. 10,548,148.

(Continued)

(51) Int. Cl.
*H04W 72/56* (2023.01)
*H04L 67/104* (2022.01)
(Continued)

(52) U.S. Cl.
CPC ........... *H04W 72/56* (2023.01); *H04L 67/104* (2013.01); *H04W 4/08* (2013.01); *H04W 4/70* (2018.02); *H04W 24/08* (2013.01); *H04W 36/0061* (2013.01); *H04W 36/305* (2018.08); *H04W 48/14* (2013.01); *H04W 56/001* (2013.01); *H04W 56/0015* (2013.01); *H04W 72/0453* (2013.01); *H04W 72/20* (2023.01);
(Continued)

(58) Field of Classification Search
None
See application file for complete search history.

(56) References Cited

U.S. PATENT DOCUMENTS 9,680,679 B2 * 6/2017 Suzuki .................. H04L 5/14
2009/0298523 A1 12/2009 Ogawa et al.
(Continued)

FOREIGN PATENT DOCUMENTS

JP 2009-124360 A 6/2009
KR 10-2011-0103852 A 9/2011
(Continued)

OTHER PUBLICATIONS

U.S. Appl. No. 61/898,084, Lindoff, Oct. 31, 2013 (Year: 2013).*
(Continued)

*Primary Examiner* — Jay L Vogel

(57) ABSTRACT

A base station assigns a first set of device-to-device (D2D) communication resources to a first D2D group and assigns a second set of D2D communication resources to a second D2D group. The D2D communication resources of the first set are different from the D2D communication resources of the second set. The first set of D2D communication resources and the second set of D2D communication resources are subsets of reserved D2D communication resources which are a subset of defined uplink communication resources defined by a communication specification for uplink communication between the D2D UE devices and a base station where the reserved D2D communication resources not used for uplink transmission to the base station.

14 Claims, 4 Drawing Sheets

Related U.S. Application Data

(60) Provisional application No. 61/919,284, filed on Dec. 20, 2013.

(51) Int. Cl.

| | | |
|---|---|---|
| *H04W 4/08* | (2009.01) | |
| *H04W 4/70* | (2018.01) | |
| *H04W 24/08* | (2009.01) | |
| *H04W 36/00* | (2009.01) | |
| *H04W 36/30* | (2009.01) | |
| *H04W 36/36* | (2009.01) | |
| *H04W 48/14* | (2009.01) | |
| *H04W 56/00* | (2009.01) | |
| *H04W 72/0453* | (2023.01) | |
| *H04W 72/12* | (2023.01) | |
| *H04W 72/20* | (2023.01) | |
| *H04W 72/21* | (2023.01) | |
| *H04W 72/51* | (2023.01) | |
| *H04W 76/14* | (2018.01) | |
| *H04W 88/02* | (2009.01) | |
| *H04W 88/08* | (2009.01) | |

(52) U.S. Cl.
CPC ........... *H04W 72/21* (2023.01); *H04W 72/51* (2023.01); *H04W 76/14* (2018.02); *H04W 36/36* (2013.01); *H04W 72/1215* (2013.01); *H04W 88/02* (2013.01); *H04W 88/08* (2013.01)

(56) References Cited

U.S. PATENT DOCUMENTS

| | | | |
|---|---|---|---|
| 2011/0182280 A1 | 7/2011 | Charbit et al. | |
| 2011/0228666 A1 | 9/2011 | Barbieri et al. | |
| 2012/0093098 A1 | 4/2012 | Charbit et al. | |
| 2012/0106517 A1 | 5/2012 | Charbit et al. | |
| 2012/0322484 A1 | 12/2012 | Yu et al. | |
| 2013/0005377 A1 | 1/2013 | Wang et al. | |
| 2013/0083699 A1 | 4/2013 | Wu et al. | |
| 2013/0114531 A1* | 5/2013 | Ahn | H04W 72/04 370/329 |
| 2013/0150061 A1 | 6/2013 | Shin et al. | |
| 2013/0324114 A1 | 12/2013 | Raghothaman et al. | |
| 2014/0057670 A1* | 2/2014 | Lim | H04W 48/16 455/509 |
| 2014/0094183 A1 | 4/2014 | Gao et al. | |
| 2014/0185495 A1 | 7/2014 | Kuchibhotla et al. | |
| 2014/0242963 A1* | 8/2014 | Novlan | H04W 48/16 455/418 |
| 2014/0243038 A1* | 8/2014 | Schmidt | H04W 76/14 455/552.1 |
| 2014/0321377 A1* | 10/2014 | Ryu | H04W 72/566 370/329 |
| 2014/0328329 A1* | 11/2014 | Novlan | H04W 56/002 370/336 |
| 2015/0148049 A1 | 5/2015 | Alberth, Jr. et al. | |
| 2015/0172896 A1* | 6/2015 | Van Phan | H04W 76/50 455/404.1 |
| 2016/0037549 A1 | 2/2016 | Seo et al. | |
| 2016/0183276 A1* | 6/2016 | Marinier | H04W 72/04 370/329 |
| 2016/0219640 A1* | 7/2016 | Jung | H04B 17/318 |
| 2016/0227518 A1 | 8/2016 | Li et al. | |
| 2016/0255515 A1* | 9/2016 | Lindoff | H04W 74/0833 370/252 |

FOREIGN PATENT DOCUMENTS

| | | | | |
|---|---|---|---|---|
| KR | 10-2012-0074247 A | 7/2012 | | |
| KR | 10-2013-0065357 A | 6/2013 | | |
| WO | 2007/145272 A1 | 12/2007 | | |
| WO | 2011-109027 A1 | 9/2010 | | |
| WO | 2013-036068 A1 | 3/2013 | | |
| WO | 2013-040070 A1 | 3/2013 | | |
| WO | 2013-062351 A1 | 5/2013 | | |
| WO | 2013-098461 A1 | 7/2013 | | |
| WO | 2013-102390 A1 | 7/2013 | | |
| WO | 2013-113371 A1 | 8/2013 | | |
| WO | 2013-162345 A1 | 10/2013 | | |
| WO | 2013-177447 A1 | 11/2013 | | |
| WO | 2014/148835 A1 | 9/2014 | | |
| WO | WO-2015020448 A1 * | 2/2015 | ............ H04W 48/08 | |

OTHER PUBLICATIONS

Novlan, U.S. Appl. No. 61/917,185, filed Dec. 17, 2013 (Year: 2013).*

U.S. Appl. No. 61/768,226, filed Feb. 22, 2013, Novlan (Year: 2013).*

Kyocera Corporation; "Resource allocation schemes for D2D communication"; R2-134311; 3GPP TSG-RAN WG2 #84; Nov. 2, 2013; San Francisco, US.

Ericsson; "On Procedures for In/Out of NW coverage detection for D2D"; R1-140780; 3GPP TSG RAN WG1 Meeting #76; Prague, Czech Republic; Feb. 10-14, 2013.

ETRI; "Overall procedure of fully scheduled allocation"; R2-133270; 3GPP TSG RAN WG2 #83bis; Ljubljana, Slovenia; Oct. 7-11, 2013.

Alacatel-Lucent and Alacatel-Lucent Shanghai Bell; "Access schemes for D2D broadcast communications"; R2-133486; 3GPP TSG RAN WG2 #83bis; Ljubljana, Slovenia; Oct. 7-11, 2013.

ZTECorporation; "On resource allocation for D2D discovery"; R2-134212; 3GPP TSG RAN WG2 Meeting #84; San Francisco, US; Nov. 11-15, 2013.

ZTE Corporation; "Considerations on D2D group communication procedure"; R2-134215; 3GPP TSG RAN WG2 Meeting #84; San Francisco, USA; Nov. 11-15, 2013.

Huawei, Hisilicon; "RAN2 considerations for D2D communication"; R2-133510; 3GPP TSG RAN WG2 Meeting #83 bis; Ljubljana, Slovenia; Oct. 7-11, 2013.

ZTE; "Resource Allocation of D2D Communication"; R1-134308; 3GPP TSG-RAN WG1, Meeting #74bis; Oct. 7-11, 2013; Guangzhou, China.

* cited by examiner ical communication resources include resources used for uplink communication from the UE devices to the base station and downlink resources used for communication transmitted from the base station to the UE devices. As is known, the uplink communication resources and downlink communication resources are defined in accordance with the specification. An example of a suitable communication specification includes the 3rd Generation Partnership Project (3GPP) Long Term Evolution (LTE) specification where the macrocell communication resources are referred to as cellular communication resources. The macrocell communication resources are time frequency resource blocks in the examples discussed herein. Other types of resources and resource blocks, however, can be used in some situations.

MANAGEMENT OF DEVICE-TO-DEVICE COMMUNICATION RESOURCES

RELATED APPLICATIONS

The present application is a continuation of U.S. application Ser. No. 15/105,451, filed Jun. 16, 2016 and entitled "MANAGEMENT OF DEVICE-TO-DEVICE COMMUNICATION RESOURCES," which is a national stage application of PCT/US2014/071266, filed Dec. 18, 2014 and entitled "MANAGEMENT OF DEVICE-TO-DEVICE COMMUNICATION RESOURCES," which claims priority to Provisional Application No. 61/919,284, entitled "Scheduling for D2D Communications" and filed Dec. 20, 2013, all of which are assigned to the assignee hereof and hereby expressly incorporated by reference in their entirety.

FIELD

This invention generally relates to wireless communications and more particularly to management of device-to-device (D2D) communication resources.

BACKGROUND

Many wireless communication systems use base stations (communication stations, transceiver stations, eNodeBs, eNBs) to provide geographical service areas where wireless communication user equipment devices (UE devices) communicate with the base station providing the particular geographical service area in which the UE devices are located. The base stations are connected within a network allowing communication links to be made between the UE devices and other devices. The communication system may include base stations that provide overlapping service areas of different sizes to serve various needs of mobile UE devices. For example, macrocell communications stations may provide macrocell service areas that are larger and may cover one or more small cell service areas provided by small cell base stations.

In some circumstances, the communication links are between wireless communication UE devices that are close to each other. In these situations, it may be preferred to have a direct communication link between the two wireless UE devices rather than communicating through a base station. Such direct communication between devices is often referred to as device-to-device (D2D) communication or peer-to-peer (P2P) communication. The communication resources (e.g., time frequency blocks) used for D2D communication are typically a subset of the communication resources used by the communication system for communication between UE devices and the base stations.

An in-coverage (InC) UE device is a UE device that is within the service area of a base station and is capable of communication with the base station. An out-of-coverage (OoC) UE device is a UE device that is not within a service area of any base station. D2D UE devices that are engaged in D2D communication with each other form a group. A D2D group, therefore, includes two or more D2D UE devices. There are five typical coverage scenarios that occur with D2D groups. In a first coverage scenario, all the UE devices of the D2D group are located in a service area of a single base station. For the first scenario, therefore, all the D2D UE devices of the D2D group are InC UE devices in a single service area. In a second coverage scenario, none of the UE devices of the D2D group are located inside any service area of any base station. For the second scenario, therefore, all of the D2D UE devices of the D2D group are OoC UE devices. In a third coverage scenario, at least one of the UE devices of the D2D group is located in a service area of a single base station and at least one D2D UE device of the group is outside all service areas. For the third scenario, therefore, at least one of the D2D UE devices of the D2D group is InC UE device in a single service area and at least one UE device is an OoC UE device. The third coverage scenario is sometimes referred to as a partial coverage scenario. In a fourth coverage scenario, at least one of the UE devices of the D2D group is located within a first service area of a first base station and at least one D2D UE device of the group located within a second service area of a second base station. For the fourth scenario, therefore, at least two of the D2D UE devices of the D2D group are InC UE devices in different service areas. In a fifth coverage scenario, at least one of the UE devices of the D2D group is located within a first service area of a first base station, at least one D2D UE device of the group located within a second service area of a second base station, and at least one UE device of the D2D group is an OoC UE device. For the fifth scenario, therefore, at least two of the D2D UE devices of the D2D group are InC UE devices in different service areas and at least one D2D UE device of the group is an OoC UE device. Other coverage scenarios are possible. Since the UE devices of a group are mobile, there are situations where the coverage scenario of a D2D group changes. For example, where only one UE device of a D2D group is in coverage and moves out of coverage, the coverage scenario changes from a partial coverage scenario to an out of coverage scenario.

SUMMARY

A base station assigns a first set of device-to-device (D2D) communication resources to a first D2D group and assigns a second set of D2D communication resources to a second D2D group. The D2D communication resources of the first set are different from the D2D communication resources of the second set. The first set of D2D communication resources and the second set of D2D communication resources are subsets of reserved D2D communication resources which are a subset of defined uplink communication resources defined by a communication specification for uplink communication between the D2D UE devices and a base station where the reserved D2D communication resources not used for uplink transmission to the base station.

DETAILED DESCRIPTION

Figure 1:
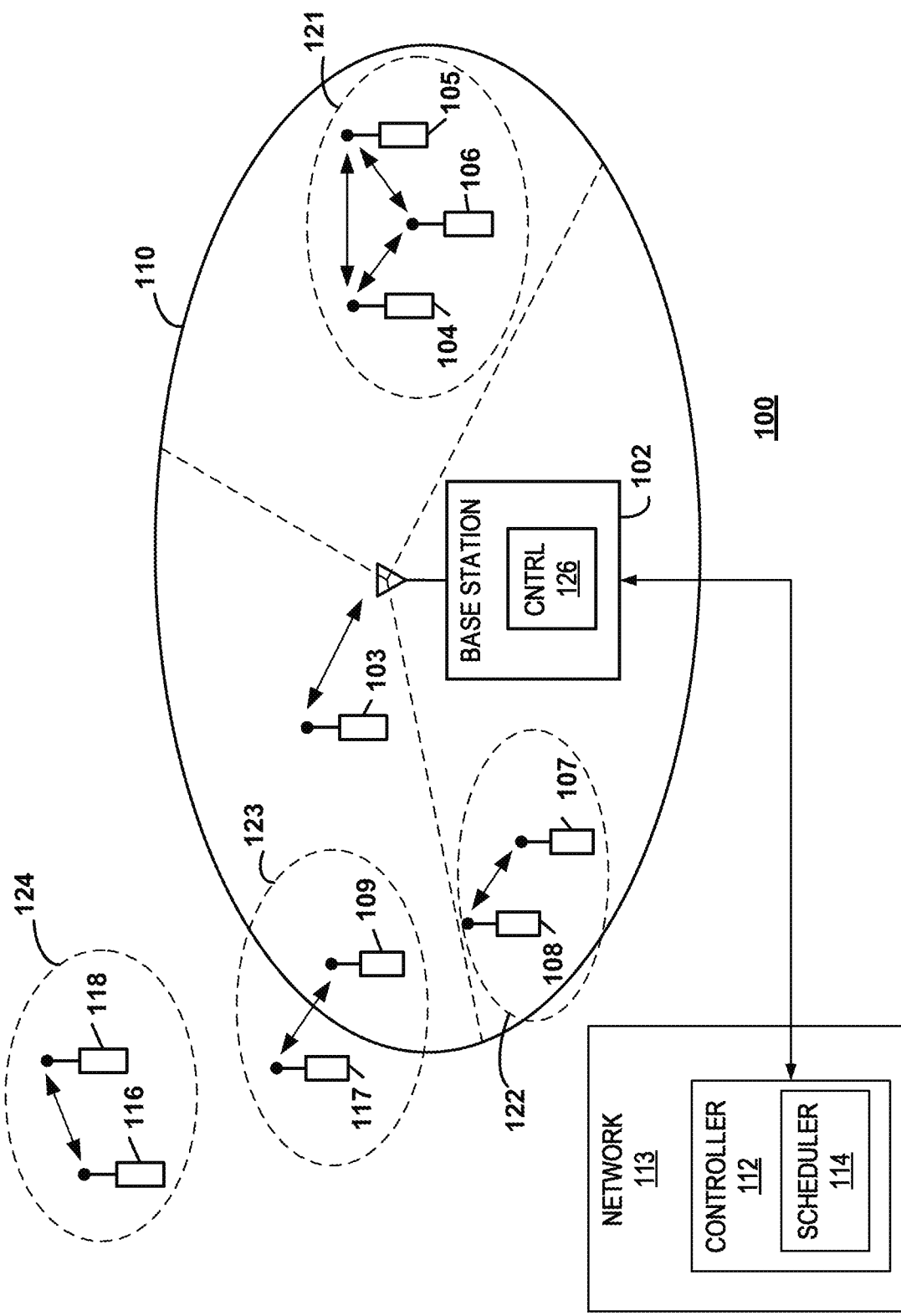
FIG. 1 is a block diagram of a communication system where macrocell communication resources are used for device-to device (D2D) communication.

A communication specification defines macrocell communication resources for communication between base stations (communication stations, eNBs, etc.) and wireless communication user equipment (UE) devices. The macrocell communication resources include defined downlink communication resources and defined uplink communication resources, both defined by the communication specification. Downlink communication resources selected from the defined downlink communication resources that are assigned (scheduled) for downlink communication are referred to as scheduled downlink communication resources. Uplink communication resources selected from the defined uplink communication resources that are assigned (scheduled) for uplink communication are referred to as scheduled uplink communication resources. In accordance with embodiments of the invention, some macrocell communication resources are reserved for device-to-device (D2D) communication. These reserved resources are referred to as reserved D2D communication resources. Although defined downlink communication resources and/or defined uplink communication resources can be used for D2D communication, only defined uplink resources are used for D2D communication in the examples herein. A portion of the reserved D2D communication resources is reserved for out-of-coverage (OoC) D2D communication and another portion is reserved for in-coverage (InC) D2D communication. The portion of D2D communication resources reserved for out-of-coverage (OoC) D2D communication is referred to herein as OoC D2D reserved communication resources and the portion reserved for in-coverage (InC) D2D communication is referred to herein as InC D2D reserved communication resources. For the example, all reserved D2D communication resources that are not reserved for OoC D2D communication are reserved for InC D2D communication. As discussed below in further detail, different sets of InC D2D reserved communication resources are assigned to different D2D groups. Communication resource allocation information indicating the resource assignment is broadcast to all of the D2D UE devices within the service area of the base station in some circumstances. In other circumstances, communication resource allocation information is transmitted to at least one of the D2D UE devices of the D2D group. For some examples, the InC D2D communication resources are assigned to the D2D groups based on a priority level of the group. The priority levels of the D2D groups can be obtained from the network and/or relayed to the base station by one or more D2D UE devices. In some circumstances, a D2D group may be in a partial coverage scenario where the D2D group includes at least one InC D2D UE device and at least one OoC D2D UE device. In such scenarios, the OoC D2D UE device(s) only transmit D2D signals using selected OoC D2D communication resources selected from the reserved OoC D2D communication resources. The InC D2D UE devices transmit using the selected InC D2D communication resources selected from the assigned set of InC D2D communication resources. In some exceptional cases, a InC D2D UE device may use OoC communication resources. One advantage of reserving D2D communication resources is that UE devices interested in receiving D2D communication are able to monitor the signals more efficiently.

FIG. 1 is a block diagram of a communication system 100 where macrocell communication resources are used for device-to device (D2D) communication. A base station 102 provides wireless communication services to wireless communication UE devices 103-109 within a geographical service area 110, sometimes referred to as a cell. Several base stations are typically interconnected through a backhaul to provide several service areas to cover large areas. The various functions and operations of the blocks described with reference to the communication system 100 may be implemented in any number of devices, circuits, or elements. Two or more of the functional blocks may be integrated in a single device and the functions described as performed in any single device may be implemented over several devices. For example, at least some of the functions of the controller 112 may be performed by the base station 102 and vice versa. A cellular communication system is typically required to adhere to a communication standard or specification. The Third-Generation Partnership Project Long-Term Evolution (3GPP LTE) communication specification is a specification for systems where base stations (eNodeBs) provide service to wireless communication devices (user equipment (UE) devices) using orthogonal frequency-division multiplexing (OFDM) on the downlink and single-carrier frequency-division multiple access (SC-FDMA) on the uplink. Although the techniques described herein may be applied in other types of communication systems, the exemplary systems discussed herein operate in accordance with a 3GPP LTE communication specification.

The base station 102 is a fixed transceiver station, sometimes referred to as an eNodeB or eNB, which may include a controller in some circumstances. The base station 102 is connected to a controller 112 within the cellular network 113 through a backhaul which may include any combination of wired, optical, and/or wireless communication channels. For the examples herein, the controller 112 includes the functionality of the Mobility Management Entity (MME) and the Packet Gateway (P-GW). Accordingly, the controller 112 includes a scheduler 114. In the example, the scheduler 114 allocates time-frequency resources for communication between the UE devices 103-109 as well as between the base station 102 and the UE devices 103-109. Wireless UE communication devices 116-118 outside of the geographic service area 110 are capable of receiving wireless service form the base station 102 when the devices 116-118 are within the service area 110. Since, the devices 116-118, however, are out of range of the base station 102, communication resources cannot be dynamically assigned or scheduled for the devices 116-118 when they are outside of the service area 110.

The wireless (UE) communication devices 103-109,116-118 (collectively UE devices) may be referred to as mobile devices, wireless devices, wireless communication devices, and mobile wireless devices, UEs, UE devices as well as by other terms. The UE devices include electronics and code for communicating with base stations and with other UE devices in device-to-device configurations. The UE devices include devices such as cell phones, personal digital assistants (PDAs), wireless modem cards, wireless modems, televisions with wireless communication electronics, and laptop and desktop computers as well as other devices. The combination of wireless communication electronics with an electronic device, therefore, may form a UE device. For example, a UE device may include a wireless modem connected to an appliance, computer, television, or other device.

As explained above, in some situations, two or more UE devices may communicate directly with each other without communication through a base station. Such device-to-device (D2D) communication may occur between UE devices within the service area of a base station or outside the service area. For the example discussed herein, the in coverage (InC) D2D UE devices 104-109 are within the service area 110 and communicate with other D2D UE devices within the same D2D group using D2D communication. Out of Coverage (OoC) D2D UE devices 116-118 are outside of the service area 110 and communicate with each other using D2D communication.

For the example of FIG. 1, the D2D UE devices are part of four D2D groups 121, 122, 123, 124. Although the first D2D group includes three D2D UE devices 104, 105, 106 and the other D2D groups 122, 123, 124 include two D2D UE devices, a D2D group can include any number of D2D UE devices greater than one. Therefore, a D2D group includes at least two D2D UE devices that communicate with each other using D2D communication resources. A D2D group may be in an in-coverage (InC) scenario, partial coverage scenario, or an out-of-coverage (OoC) scenario. The first D2D group 121 and the second D2D group 122 in FIG. 1 are in the InC scenario. The third D2D group 123 is in a partial coverage scenario since at least one D2D UE devices 109 of the D2D group 123 is within the service area 110 and at least one D2D UE devices 117 of the D2D group 123 is outside the service area 110. The fourth D2D group 124 is in the OoC scenario.

The base station 102 includes a wireless transceiver (transmitter and receiver) that can exchange wireless signals with the UE devices 103-109 within the service area 110. Transmissions from the base stations and from the UE devices 103-109 are governed by a communication specification that defines signaling, protocols, and parameters of the transmission. The communication specification may provide strict rules for communication and may also provide general requirements where specific implementations may vary while still adhering to the communication specification. Although the discussion below is directed to the 3GPP Long Term Evolution (LTE) communication specification, other communication specifications may be used in some circumstances. The communication specification defines at least a data channel and a control channel for uplink and downlink transmissions and specifies at least some timing and frequency parameters for physical downlink control channels from a base station to a UE device.

A substantial portion of the macrocell communication resources are used for transmitting the downlink signals and the uplink signals. The base station 102 transmits downlink signals to the UE devices 103-109 using scheduled downlink communication resources of the defined downlink communication resources defined by the communication specification and reserved for downlink communication. The UE devices transmit uplink signals to the base station 102 using scheduled uplink communication resources of the defined uplink communication resources defined by the communication specification and reserved for uplink communication. The macrocell communication resources include frequency bands divided in time where each frequency band and segment of time can be identified by the scheduler 114 and described in control signals sent from the base station 102 to the UE devices 103-109. The communication specifications, or other system rules, therefore, define applicable communication resources for the downlink and applicable communication resources for the uplink. The scheduler 114 allocates different time-frequency resources to different devices to efficiently utilize the resources while minimizing interference. Accordingly, the scheduled macrocell communication resources used for signals exchanged with one UE device are different from scheduled macrocell communication resources used for other signals exchanged with other UE devices. As referred to herein, therefore, the defined macrocell communication resources are the communication resources reserved for communication by the specification and/or communication system rules. The scheduled resources for macrocell transmission for particular signals, however, are a subset of the reserved macrocell communication resources and are typically dynamically changed during operation.

In conventional systems, a scheduler allocates time-frequency resources for communication between the base station and the UE devices. In the examples discussed herein, however, the scheduler 114 also assigns time-frequency resources (D2D communication resources) for communication between UE devices 104-109 to establish and maintain a device-to-device (D2D) communication link. For the examples herein, the scheduler and/or base station 102 assign sets of reserved InC D2D communication resources to the D2D groups 121-124. The InC D2D UE devices select resources from the set of D2D communication resources assigned to the D2D group. OoC UE devices, on the other hand, select resources from reserved OoC D2D communication resources without dynamic scheduling or assignment by the scheduler.

For the example in FIG. 1, a first set of D2D communication resources of the reserved InC D2D communication resources are assigned to the first D2D group 121 and a second set of D2D communication resources of the reserved InC D2D communication resources are assigned to the second D2D group 122. In addition, a third set of D2D communication resources of the reserved InC D2D communication resources are assigned to the third D2D group. The Inc D2D UE devices select communication resources from the assigned set of resources for D2D communication. For the examples, the D2D UE devices select a resource by observing (listening) the communication resource to determine if another device is using the resource for transmission. The D2D UE device only selects and uses the communication resource if it is determined that the resource is not currently being used. The OoC D2D UE devices 116, 118 may select resources from the reserved OoC D2D communication resources in a similar manner.

For the examples herein, the D2D resources are selected by a base station controller 126 at the base station 102. The base station controller 126 may be part of the base station or connected to the base station 102. The base station controller 126 communicates with the network 113 and makes determinations regarding the appropriate resources to assign to D2D groups as well as performing other functions discussed herein. In some situations, the functions described as performed by the base station controller 126 may be performed by other equipment or entities in the network 113 or the base stations. Further, functions described as performed by the base station 102 are performed by the base station controller 126 in some circumstances.

Figure 2:
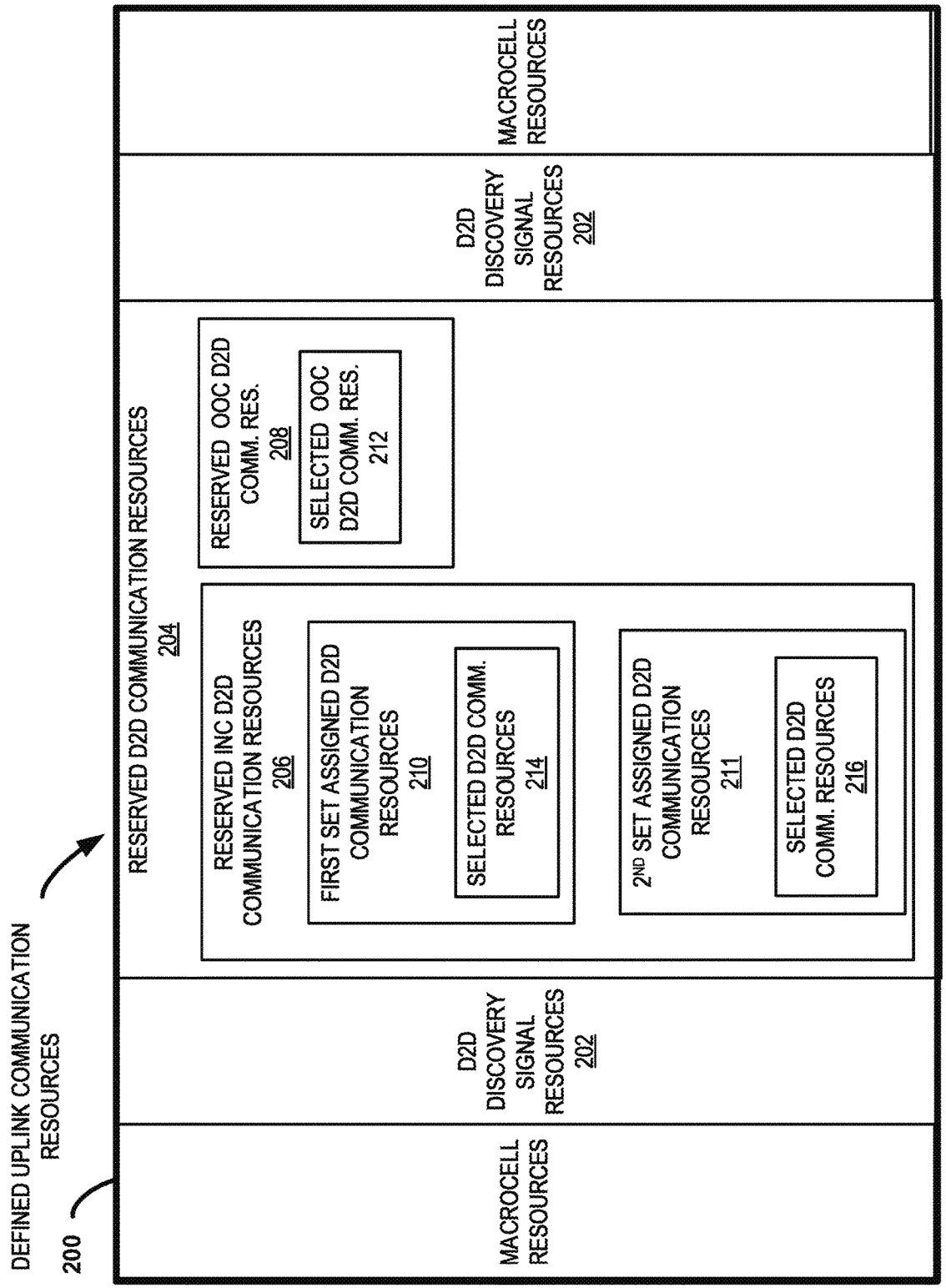
FIG. 2 is a block diagram of the macrocell communication resources and the D2D communication resources.

FIG. 2 is a block diagram of the macrocell communication resources and the D2D communication resources. The various blocks in FIG. 2 represent sets of communication resources where a first block within a second block indicates that the first block includes communication resources that are a subset of the second block. Communication resources may be divided in frequency, time, and/or by coding. For the examples herein, the communication resources are time-frequency communication resources. Uniform single blocks do not necessarily indicate that all the resources within the block are continuous in frequency and time. Therefore, a block represents a collection of resources that may not be adjacent in time or frequency.

For the examples herein, a portion of the defined uplink communication resources 200 are reserved for D2D communication. Some defined uplink communication resources 200 are reserved for D2D discovery signal transmission and are referred to as D2D discovery signal resources 202.

Another portion of the defined uplink communication resources 200 are reserved for other D2D transmissions and are referred to as the reserved D2D communication resources 204. The reserved D2D communication resources 204 include reserved InC D2D communication resources 206 and reserved OoC D2D communication resources 208.

The reserved InC D2D communication resources 206 provide a pool of communication resources that can be scheduled (assigned) by the controller 112 to the InC D2D UE devices in the D2D groups 121, 122, 123 for D2D communication within the service area 110. When the resources are assigned to a D2D group, they are referred to as assigned D2D communication resources. For the example of FIG. 2, two sets of InC D2D communication resources have been assigned. Accordingly, for the example, the reserved InC D2D communication resources 206 include a first set of assigned D2D communication resources 210 and a second set of assigned D2D resources 212. The first set of assigned D2D communication resources 210 is assigned to one D2D group (e.g., the first D2D group 121) and the second set of assigned D2D communication resources 212 are assigned to another D2D group (e.g., the second D2D group 122). In situations where two groups are sufficiently geographically separated, the same (or overlapping) communication resources may be assigned to the two D2D groups.

When downlink communication resources are assigned for D2D communication, those resources are not used for downlink communication. For example, if the communication resources are time-frequency communication resources, the time segments and frequency bands assigned to the D2D communication link are not used by the base station 102 to serve non-D2D wireless communication UE devices (104). Where uplink communication resources are assigned for D2D communication, the resources are assigned such that communication between a group of D2D wireless communication UE devices does not interfere with communications between any other D2D wireless communication UE devices in other groups. For example, orthogonal or nearly orthogonal, resources may be used relative to other nearby D2D device groups. D2D device groups that are sufficiently far from each other may be able to reuse communication resources and avoid interference. For example, if the D2D devices of each group are relatively close to each other but the D2D groups are relatively far from each other, the transmission power level used within each D2D group may be sufficiently low to allow reuse of communication resources within the same service area 110. The determination to reuse resources within the same coverage area 110 depends on the procedure for controlling transmission power of the D2D communication signals. For example, if the UE devices are transmitting at maximum power, the ability to reuse resources for another group within the same coverage area is significantly reduced or made impossible. In situations where the base station 102 has information regarding at least the general locations of the UE devices for each D2D group, the base station determines whether D2D groups are sufficiently apart to avoid interference. The base station subsequently, specifies the maximum allowable transmission power when the D2D communication resources are assigned. Alternatively, the base station can allow the UE devices within the same group to restrict their own transmit power based on the received power from other D2D UE devices within the D2D group.

In most situations, an InC D2D UE of a D2D group will request resources for D2D communication from the base station 102. The request may include information identifying the needs of the D2D communication link. The request may also include a Group ID of the D2D group to which the InC D2D UE belongs. The Group ID may provide additional information useful for determining the needs of the D2D group. For example, the Group ID may be associated with a priority level which, as discussed below, may at least partially dictate allocation of D2D communication resources. In response to determining that a D2D connection should be established, the controller 112 allocates D2D time-frequency resources (allocated InC D2D communication resources 210) to the D2D group 121. Therefore, in accordance with the embodiments herein, some of the reserved Inc D2D communication resources 206 are assigned for device-to-device (D2D) communication between two or more wireless communication UE devices as needed.

In some situations, the allocation of D2D resources to the D2D groups is based on a priority level of the D2D communication of the group. Priority levels establish relative importance or preference of the communication. For example, a high priority level can be associated with D2D groups establishing D2D communication for public safety where D2D communication within a D2D group associated with commercial activities may be associated with a lower priority level. Any number of priority levels may be employed depending on the particular implementation. The communication resources assigned to a higher priority group may include more resources than a lower priority group.

As an example, therefore, the first set of InC communication resources 210 may be allocated to first D2D group 121 based on a priority level of the D2D group 121. The second set of InC communication resources 212 may be allocated to second D2D group 122 based on a priority level of the D2D group 122. The priority level of a particular D2D group is typically established by the network 113. In some situations, the scheduler 114 obtains the priority level of a group from the network 113. In other situations, the base station 102 may obtain the priority level from a UE device within the D2D group and provide the priority level to the scheduler 114 to facilitate allocation of the D2D resources.

Any of numerous techniques may be used to inform the InC D2D UEs of the scheduled resources. One technique includes transmitting communication resource allocation (CRA) information from the base station 102 to at least one of the Inc D2D UE devices 106 in a D2D group after the controller 112 determines that D2D link communication should be established and determines the resources that should be allocated for D2D. In another example of allocating the InC D2D communication resources 206, the base station 102 broadcasts a message identifying the set of assigned InC D2D communication resources 210 for use by the first D2D group 121 and broadcasts a message identifying the second set of assigned InC D2D communication resources 211 for use by the first D2D group 122. An example of a suitable technique for broadcasting the CRA information includes transmitting the CRA information in _ System Information Block Type 18 for D2D communication and System Information Block Type 19_for D2D discovery transmissions. The broadcast information should also include the Group ID associated to an assigned resource. Alternatively, the CRA information may also be send to the InC D2D UEs using dedicated signaling or more specifically, using a RRCConnectionReconfiguration message including proseDiscConfig or proseCommConfig. With the dedicated signaling, it is assumed that the base station 102 would assign the same resources to all the InC D2D UEs belonging to the same group. The UE devices within the D2D groups employ a listen-before-transmit procedure in accordance with a Carrier Sense Multiple Access (CSMA) technique to identify the scheduled InC D2D communication resources 210 that will be used by each particular group.

The InC D2D UE devices select resources from the assigned set of D2D communication resources assigned to the D2D group. For the example, therefore, the D2D UE devices 104,105,106 select resources (selected D2D communication resources 214) from the first set of assigned D2D communication resources 210 assigned to the first group 121 and the D2D UE devices 107, 108 select resources (selected D2D communication resources 216) from the second set of assigned D2D communication resources 211 assigned to the second D2D group 122. The selected InC D2D resources 214 may be distributed in several blocks within the assigned set of assigned D2D communication resources 210. In other words, the selected communication resources are not necessarily continuous set of adjacent resources. Further, an assigned set of D2D resources 210 may be distributed in several blocks within the reserved InC D2D communication resources 206.

OoC D2D UE devices 116, 118 select communication resources form the reserved OoC D2D communication 108 without scheduling or assignment from the base station 102. The OoC D2D UE devices 116, 118 autonomously select resources (selected OoC D2D communication resources 212) from the reserved OoC D2D reserved communication resources 208 using a technique that minimizes interference between other OoC D2D groups. A suitable example for selecting resources includes employing a listen-before-transmit procedure in accordance with a Carrier Sense Multiple Access (CSMA) technique. Other methods can be used to determine which of the reserved OoC D2D communication resources will be used for a particular OoC D2D group.

In some situations, the base station 102 may assign some of the OoC D2D resources to InC D2D UEs. The OoC D2D UE devices 116, 118, however, can only select resources from the reserved OoC D2D communication resources 208 for transmission. In some circumstances where the base station 102 has not scheduled or otherwise allocated D2D resources to the InC D2D UEs, the InC D2D UEs use reserved OoC D2D communication resources 208 that are not selected OoC D2D communication resources being used by the OoC D2D UE devices. In some cases, the InC D2D UEs may only use the OoC D2D communication resources 208 if permitted by the base station 102.

The selected OoC D2D resources may be distributed in several blocks within the reserved OoC D2D communication resources 208. In other words, a first set of communication resources selected by a first group of OoC D2D UE devices may be separated in time and frequency from a second set of communication resources selected by a second group of OoC D2D UE devices. Further, the selected resources by any particular D2D group may also be separated within the reserved OoC D2D communication resources.

The third D2D group 123 is an example of a D2D group in a partial coverage scenario. For the examples, the OoC D2D UE 117 of the group only uses selected OoC D2D communication resources 212 for transmitting D2D signals within the D2D group 123 and the InC D2D UE device 109 of the D2D group 123 transmits D2D signals using selected D2D communication resources selected from the set of assigned D2D communication resources (not shown in FIG. 2). In some situations, the Inc D2D UE device 109 uses OoC resources for transmission.

Figure 3:
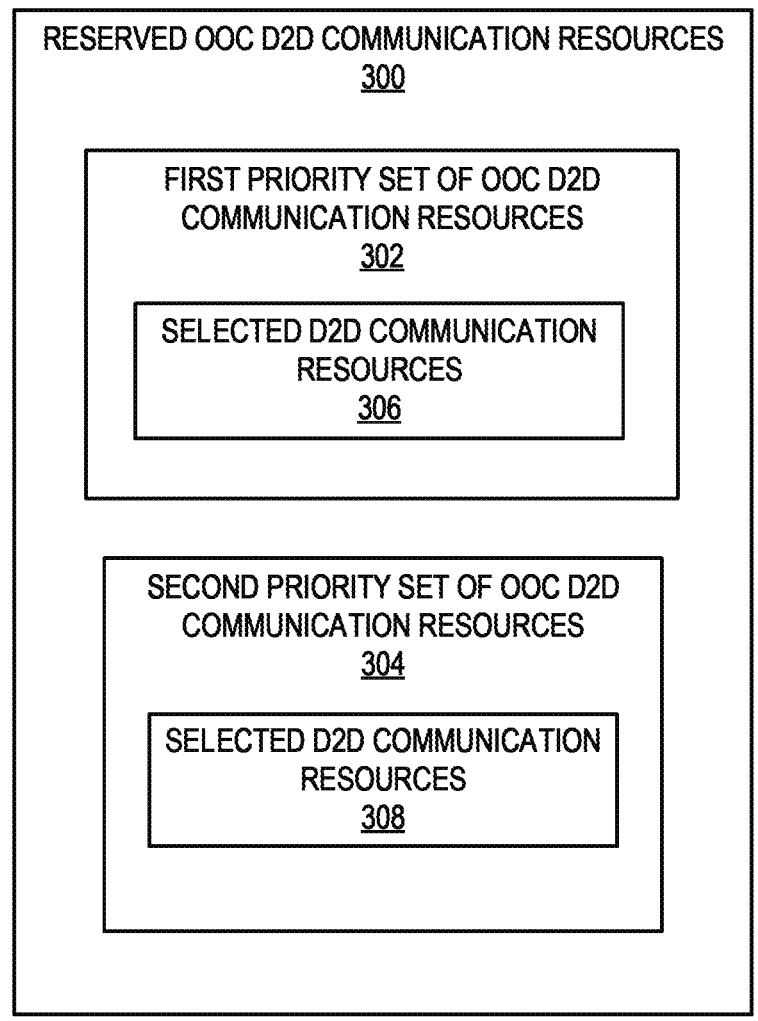
FIG. 3 is a block diagram of reserved OoC D2D resources having OoC priority sets.

FIG. 3 is a block diagram of reserved OoC D2D resources 300 having OoC priority sets 302, 304. For the example of FIG. 3, the reserved OoC D2D communication resources are further organized into priority sets 302, 304. Therefore, the reserved OoC D2D resources 300 is an example of the reserved OoC D2D resources 208 of FIG. 2 where the OoC resources are organized into two priority sets 302, 304. In some circumstances, the priority sets 302 and 304 are semi-statically assigned by the base station 102. In other situations, the priority sets 303 304 are static and are preconfigured. Additional priority sets can be used in some circumstances. For the examples herein, the priorities are identified by Group IDs. The Group IDs are associated with a priority level assigned by the higher layer such as the ProSe function or the D2D application layer. The based station 102 obtains such information from the ProSe function directly or through the UE devices if the D2D UE devices have such information. In other examples, the OoC D2D UE devices may select resources from a priority set if the D2D communication priority level is equal to or greater to the priority level associated with the priority set. As discussed above, priority levels are typically established by the network 113. Since the OoC UE devices do not have access to the network, priority levels established for types of D2D communication the last time the UE device were in coverage are maintained for OoC D2D communication. As discussed above, the priority levels are established semi-statically and, as a result, the priority level information maintained at an OoC UE device is likely accurate. An example of a situation where OoC UE devices may have established priority levels arises when some UE devices use the D2D resources of public safety purposes and other OoC UE devices are using the D2D resources for other purposes such as D2D communication for commercial use. The UE devices used for public safety may be assigned a higher priority level than the other UE devices. As a result, the UE devices not engaging in D2D communication for public safety purposes are restricted to the second priority set of OoC D2D communication resources. The first priority set of OoC D2D communication resources are available to the public safety UE devices. In some situations, the second priority set of OoC D2D communication resources may also be available to the higher priority UE devices.

Therefore the OoC D2D UE devices select resources from the priority set of D2D communication resources authorize for the UE devices based on the Group ID and priority level assigned to the D2D group. Therefore, D2D UE devices of a first priority select resources (selected D2D communication resources 306) from the first priority set of D2D communication resources 302 and D2D UE devices with second level priority select resources (selected D2D communication resources 308) from the second priority set of D2D communication resources 304. The selected D2D resources 306 may be distributed in several blocks within the first priority set of D2D communication resources 302.

Figure 4:
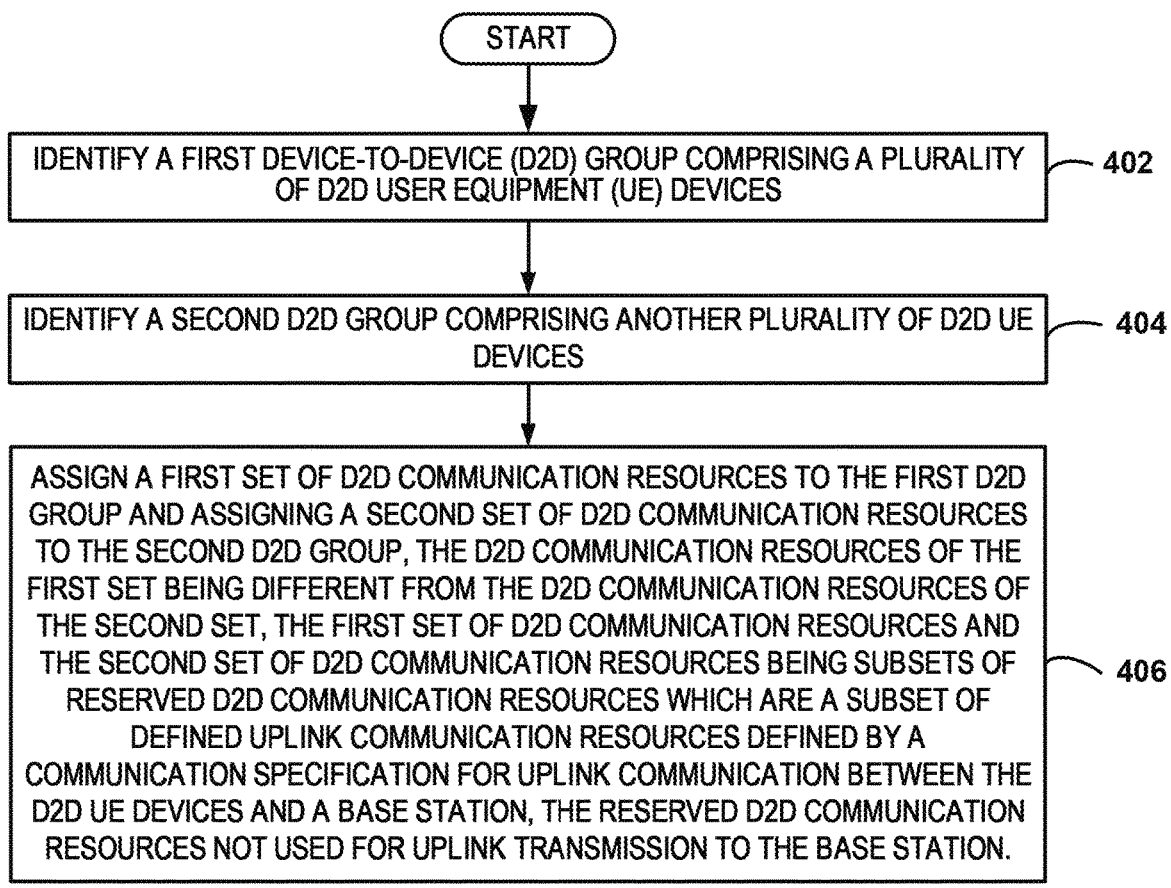
FIG. 4 is flow chart of a method of managing device-to-device (D2D) communication resources in a cellular system.

FIG. 4 is flow chart of a method of managing device-to-device (D2D) communication resources in a cellular system.

At step 402, a first D2D group is identified. The first D2D group includes at least two D2D UE devices. For the examples the base station 102 receives requests from UE devices for D2D communication resource. The requests identify the UE devices that will communicate with each other using the D2D communication resources. The base station and/or controller associates the D2D UE devices with the first D2D group.

At step 404, a second D2D group is identified. The second D2D group includes at least two D2D UE devices.

At step 406, the a first set of D2D communication resources is assigned to the first D2D group and a second set of D2D communication resources is assigned to the second D2D group. The D2D communication resources of the first set are different from the D2D communication resources of the second set. As discussed above, the first set of D2D communication resources and the second set of D2D communication resources are subsets of reserved D2D communication resources which are a subset of defined uplink communication resources defined by a communication specification for uplink communication between UE devices and a base station. The reserved D2D communication resources are not used for uplink transmission to the base station.

The UE devices from the first D2D group select resources form the first set and the UE devices from the second group select resources form the second set. A discussed above, a suitable method of selecting the resources includes using a listen then transmit technique such as CSMA. Accordingly, one or more UE devices of the first group select D2D communication resources for the first set for D2D transmission at times determined by the one or more UE devices. The UE devices transmit D2D signals using the selected communication resource only if a determination is made than no other UE device is using the selected communication resource. In some cases, a UE device only transmit D2D signals if it does not receive any D2D signal from another UE device belonging to the same group. The UE devices of the second D2D group select resources form the second set in a similar fashion.

For the examples, the controller 126 at the base station 102 assigns the sets of D2D communication resources to the D2D groups based on a priority level of the D2D communication of each group. For the examples, the priority levels are determined by the ProSe Function as specified by the 3GPP LTE communication specification. The priorities are typically assigned semi-statically, and therefore, do not change frequently. The priority level of the D2D group is typically conveyed to the UE devices using the PC3 interface (IP protocol) although other techniques may be used. The controller 126 at the base station determines the priority levels from the D2D groups either by obtaining the information from the ProSe Function or from the UE devices. Based on the information received directly from the network 113 or relayed by the UE devices, therefore, the controller 126 at the base station 102 determines a first priority level for D2D communication between the UE devices of the first D2D group and determines a second priority level for D2D communication between the UE devices of the second D2D group. The base station 102 then assigns the D2D communication resources based on the first priority level and the second priority level. The communication resources can be conveyed to the UE devices by broadcasting the information or by dedicated signaling. In situations where the D2D UE devices have the Group ID information, the base station 102 can broadcast only information identifying the D2D communication resources assigned to the Group ID. The UE D2D devices can then determine which D2D communication resources are assigned to the group in which they are communicating.

As discussed above, the reserved D2D communication resources include reserved in-coverage (InC) D2D communication resources and reserved out-of-coverage (OoC) D2D communication resources. The InC D2D communication resources include the first set of D2D communication resources and the second set of communication resources. The reserved InC D2D communication resources are reserved for D2D transmission by InC D2D UE devices that are within a service area of the base station and the reserved OoC D2D communication resources are reserved for D2D transmission by OoC D2D UE devices that are outside the service area.

As discussed above, partial coverage scenarios can occur where a D2D group includes one of more InC D2D UE devices located within the service area and one or more OoC D2D UE devices located outside the service area. In such situations, the InC D2D UE devices transmit D2D signals using the selected D2D communication resources within the assigned set of D2D communication resources and the OoC D2D UE device transmit D2D signals using only selected D2D communication resources selected from the reserved OoC D2D communication resources.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A user equipment (UE) device in a cellular communication system comprising:
   a controller configured to perform direct communication with another UE device, wherein the controller is further configured to perform the processes of:
   identifying a communication priority of the direct communication to be performed with the another UE device, the direct communication after completion of a discovery procedure with the another UE device;
   transmitting, to a base station, information indicating the communication priority, the communication priority indicating priority relative to other direct communication;
   receiving, from the base station, a set of time-frequency resources for the direct communication for data transmissions, the set of time-frequency resources assigned based on a higher communication priority than a lower communication priority;
   performing a listen-before-transmit procedure in the set of time-frequency resources;
   selecting, based on the listen-before-transmit procedure, a subset of the set of time-frequency resources for the direct communication.

2. The UE device of claim 1, wherein the controller is further configured to perform the process of transmitting information indicating the communication priority by transmitting, to the base station, a message requesting time-frequency resources for the direct communication, the message including the information indicating the communication priority.

3. The UE device of claim 1, wherein the set of time-frequency resources for the direct communication are assigned for the communication priority.

4. The UE device of claim 1, wherein the set of time-frequency resources assigned based on the higher communication priority include more resources than at least one other set of time-frequency resources assigned to the lower communication priority.

5. A user equipment (UE) device in a cellular communication system comprising:

a controller configured to perform direct communication with another UE device, wherein the controller is further configured to perform the processes of:

identifying a communication priority of direct communication to be performed with another UE device, the direct communication after completion of a discovery procedure with the another UE device;

transmitting, to a base station, a message requesting dedicated time-frequency resources assigned to the direct communication performed with the another UE device, the message including information indicating the communication priority, the communication priority indicating priority relative to other direct communication;

receiving, from the base station, a set of time-frequency resources for the direct communication for data transmissions, the set of time-frequency resources assigned based on a higher communication priority than a lower communication priority;

performing a listen-before-transmit procedure in the set of time-frequency resources;

selecting, based on the listen-before-transmit procedure, a subset of the set of time-frequency resources for the direct communication.

6. The UE device of claim 5, wherein the set of time-frequency resources for the direct communication are assigned for the communication priority.

7. The UE device of claim 5, wherein the controller is configured to perform the processes of receiving, from the base station, the set of time-frequency resources for the direct communication in response to the transmission of the message requesting dedicated time-frequency resources assigned to the direct communication performed with the another UE device.

8. The UE device of claim 5, wherein the set of time-frequency resources assigned based on the higher communication priority include more resources than at least one other set of time-frequency resources assigned to the lower communication priority.

9. A method performed at a base station in a cellular communication system, the method comprising:

receiving, from a user equipment (UE) device, information indicating a communication priority of direct communication to be performed with another UE device after completion of a discovery procedure with the another UE device, the communication priority indicating priority relative to other direct communication;

transmitting, to the UE device, a set of time-frequency resources available for selection of a subset of the set of time-frequency resources by the UE device for the direct communication for data transmissions, the set of time-frequency resources assigned based on a higher communication priority than a lower communication priority, the transmitting of the set of time-frequency resources causing the UE device to perform a listen-before-transmit procedure in the set of time-frequency resources.

10. The method of claim 9, further comprising assigning the set of time-frequency resources for the direct communication at least partially based on the communication priority.

11. The method of claim 9, wherein the set of time-frequency resources assigned based on the higher communication priority include more resources than at least one other set of time-frequency resources assigned to the lower communication priority.

12. A method performed at a base station in a cellular communication system, the method comprising:

receiving, from a user equipment (UE) device, a message requesting dedicated time-frequency resources assigned to direct communication performed with another UE device, the message including information indicating a communication priority of the direct communication to be performed with the another UE device after completion of a discovery procedure with the another UE device, the communication priority indicating priority relative to other direct communication;

transmitting, to the UE device, a set of time-frequency resources available for selection of a subset of the set of time-frequency resources by the UE device for the direct communication in response to the reception of the message requesting dedicated time-frequency resources assigned to the direct communication performed with the another UE device, the set of time-frequency resources for the direct communication for data transmissions, the set of time-frequency resources assigned based on a higher communication priority than a lower communication priority, the transmitting of the set of time-frequency resources causing the UE device to perform a listen-before-transmit procedure in the set of time-frequency resources.

13. The method of claim 12, further comprising assigning the set of time-frequency resources for the direct communication at least partially based on the communication priority.

14. The method of claim 12, wherein the set of time-frequency resources assigned based on the higher communication priority include more resources than at least one other set of time-frequency resources assigned to the lower communication priority.

* * * * *